United States Patent [19]

Thomas

[11] Patent Number: 5,332,925

[45] Date of Patent: * Jul. 26, 1994

[54] VERTICAL WINDMILL WITH OMNIDIRECTIONAL DIFFUSION

[75] Inventor: Robert N. Thomas, Ventura, Calif.

[73] Assignee: Wind Harvest Co., Inc., Ventura, Calif.

[*] Notice: The portion of the term of this patent subsequent to Oct. 15, 2008 has been disclaimed.

[21] Appl. No.: 762,863

[22] Filed: Sep. 16, 1991

Related U.S. Application Data

[63] Continuation of Ser. No. 645,968, Jan. 25, 1991, Pat. No. 5,057,696.

[51] Int. Cl.$^5$ ............................................. F03D 7/06
[52] U.S. Cl. .................................. 290/44; 290/55; 416/119
[58] Field of Search ............... 290/44, 55; 416/14, 416/111, 119, 147, 167, 168 R

[56] References Cited

U.S. PATENT DOCUMENTS 5,057,696 10/1991 Thomas .................................. 290/44

OTHER PUBLICATIONS

Loth, J. L., "Darriens Rotor With Forward Tilting Blade Speed Control", *Solar Engineering*, Book No. H00253 (1983) pp. 590-595.

*Primary Examiner*—Howard L. Williams
*Assistant Examiner*—Robert Lloyd Hoover
*Attorney, Agent, or Firm*—John H. VandenBosche

[57] ABSTRACT

A vertical windmill employing aerodynamic lift includes stators that form an omnidirectional diffuser and can rotate out of the wind to reduce the destructive tendencies in high winds. A braking mechanism included in the windmill uses rotation of the airfoils to reduce the lift caused by the wind and disengagement of the airfoils to reduce nearly all lift on the airfoils. Centrifugal force is used to activate the brake in high winds, both to slow the rotor speed and, in extreme winds, to stop the rotor. A motor is provided to drive the windmill to simplify controls and increase energy production.

30 Claims, 7 Drawing Sheets

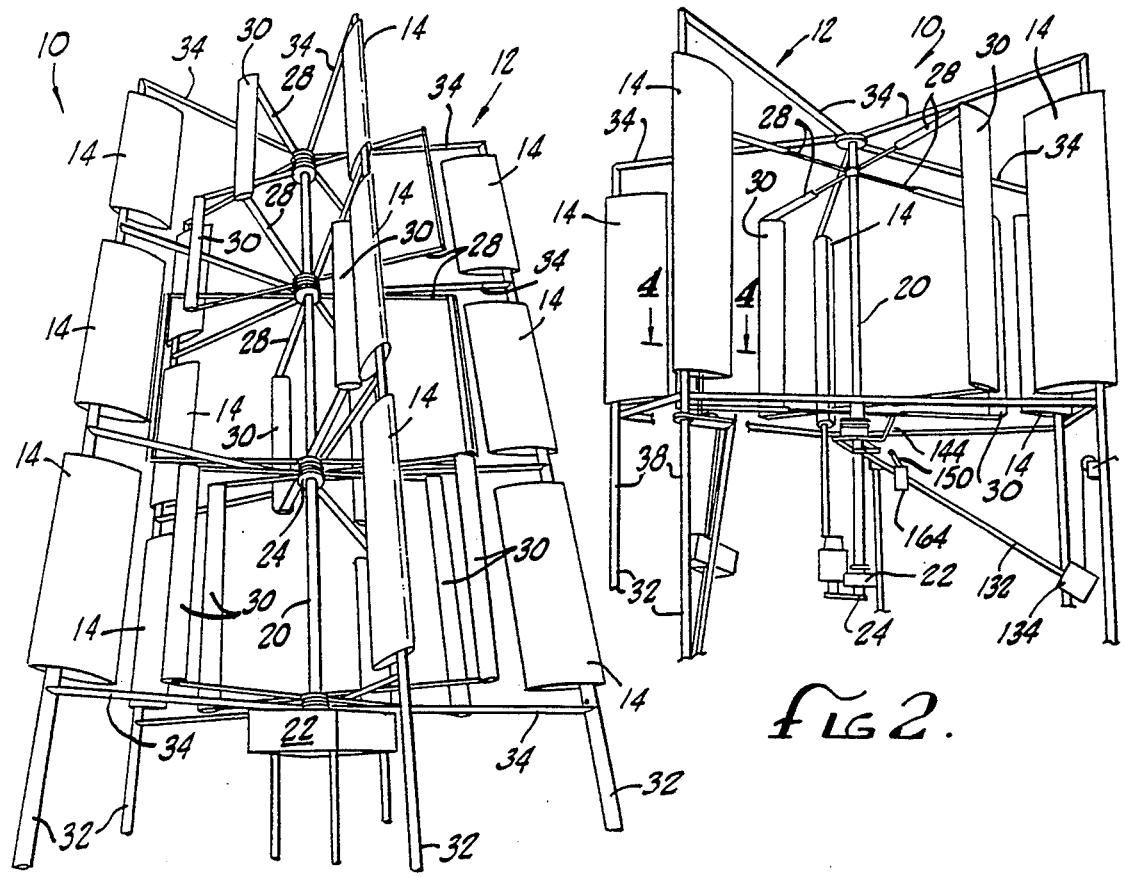
fig.1.
fig.2.
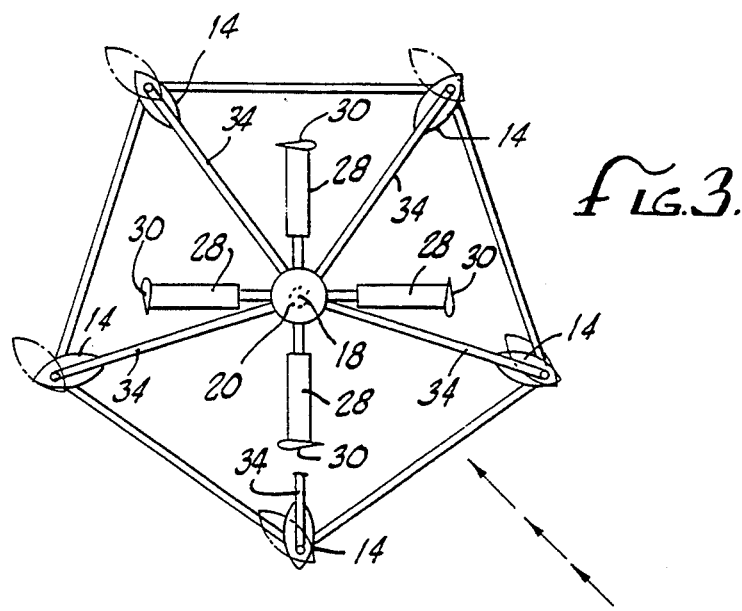
fig.3.

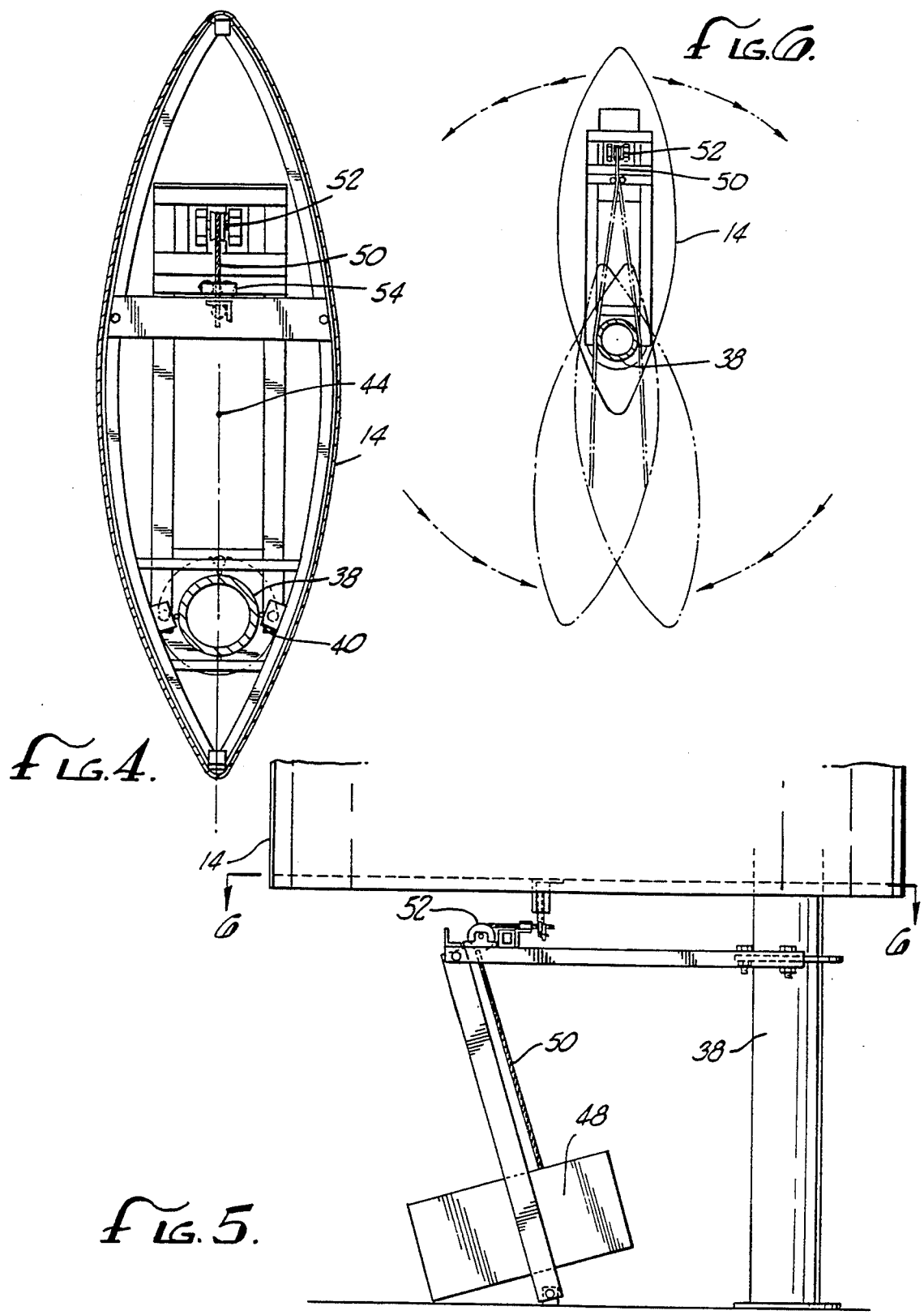

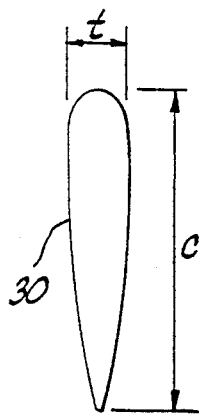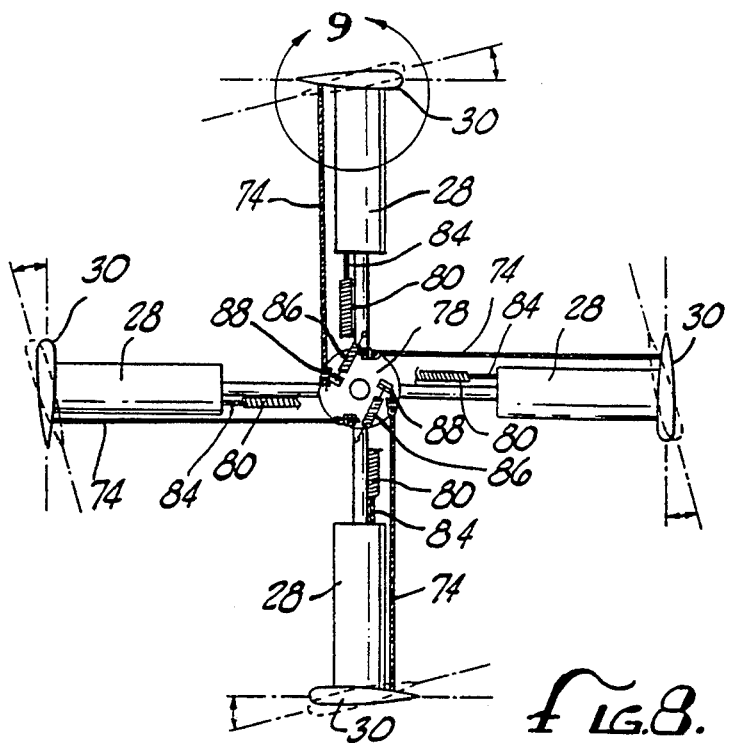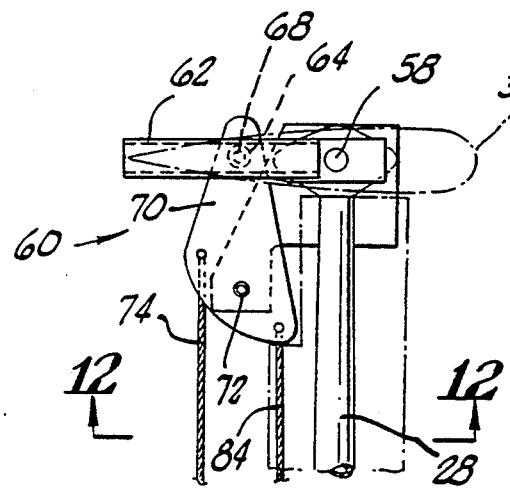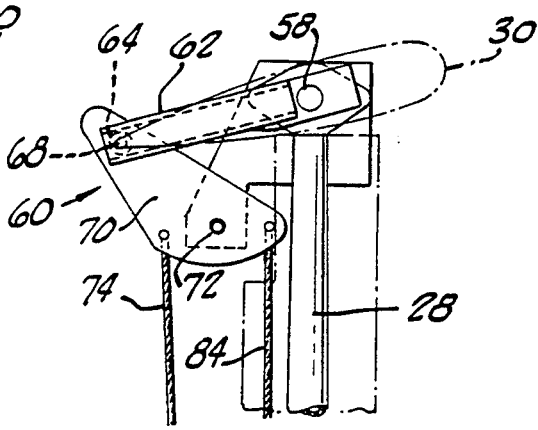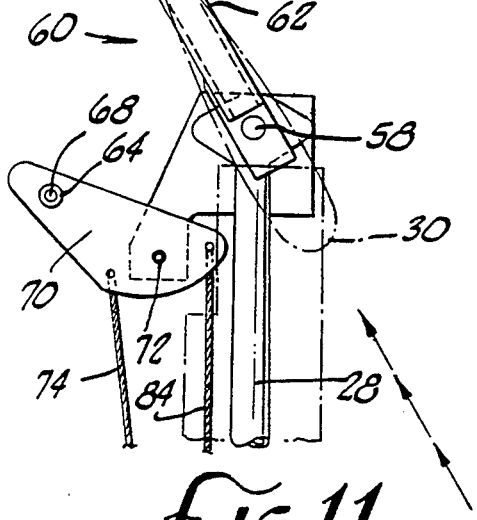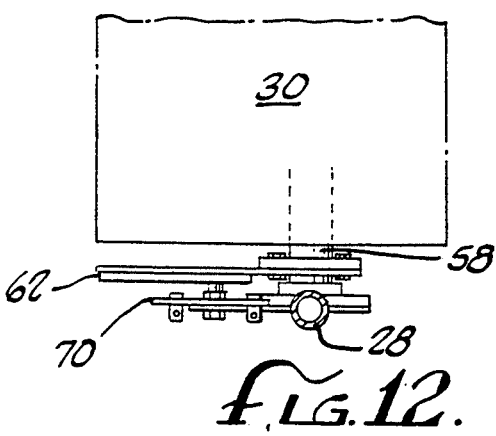

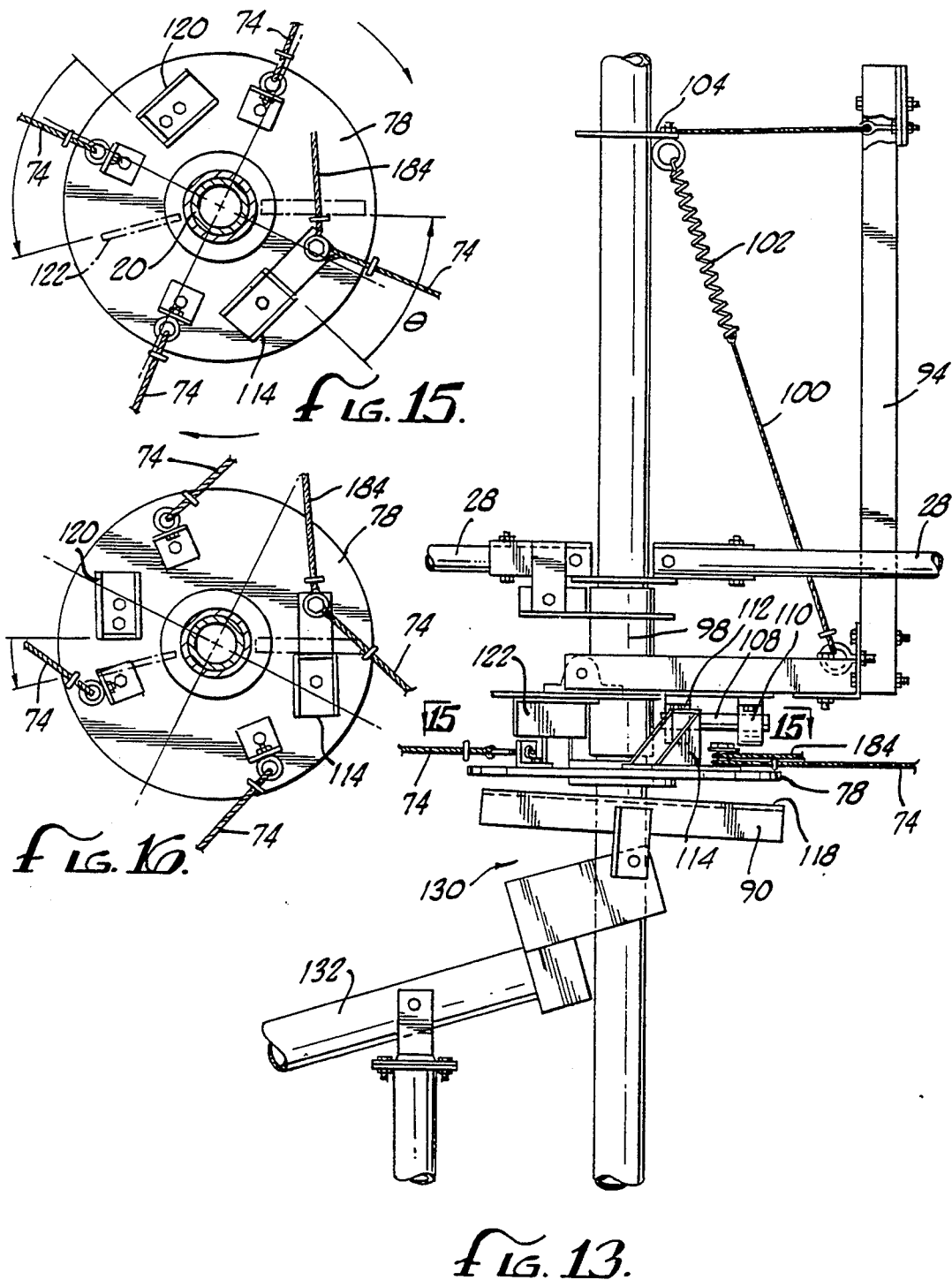

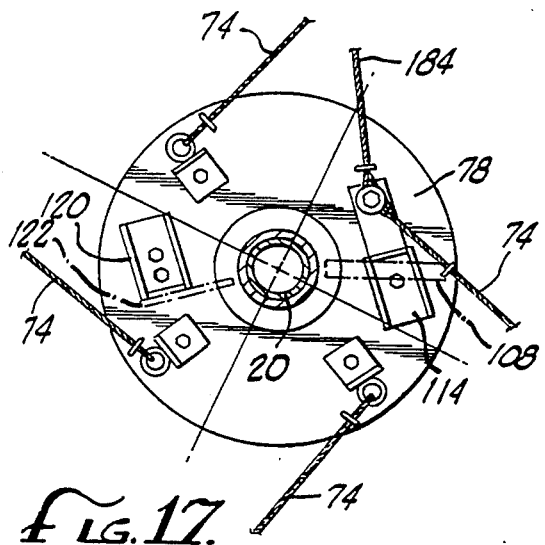
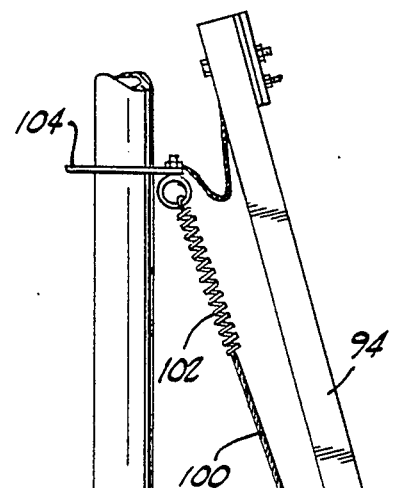
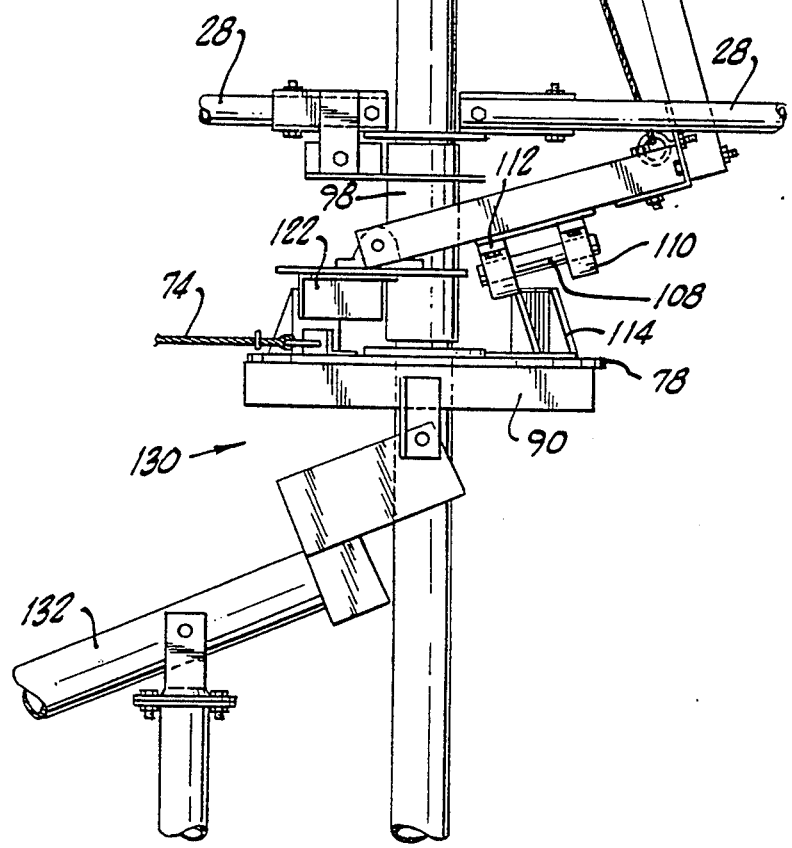

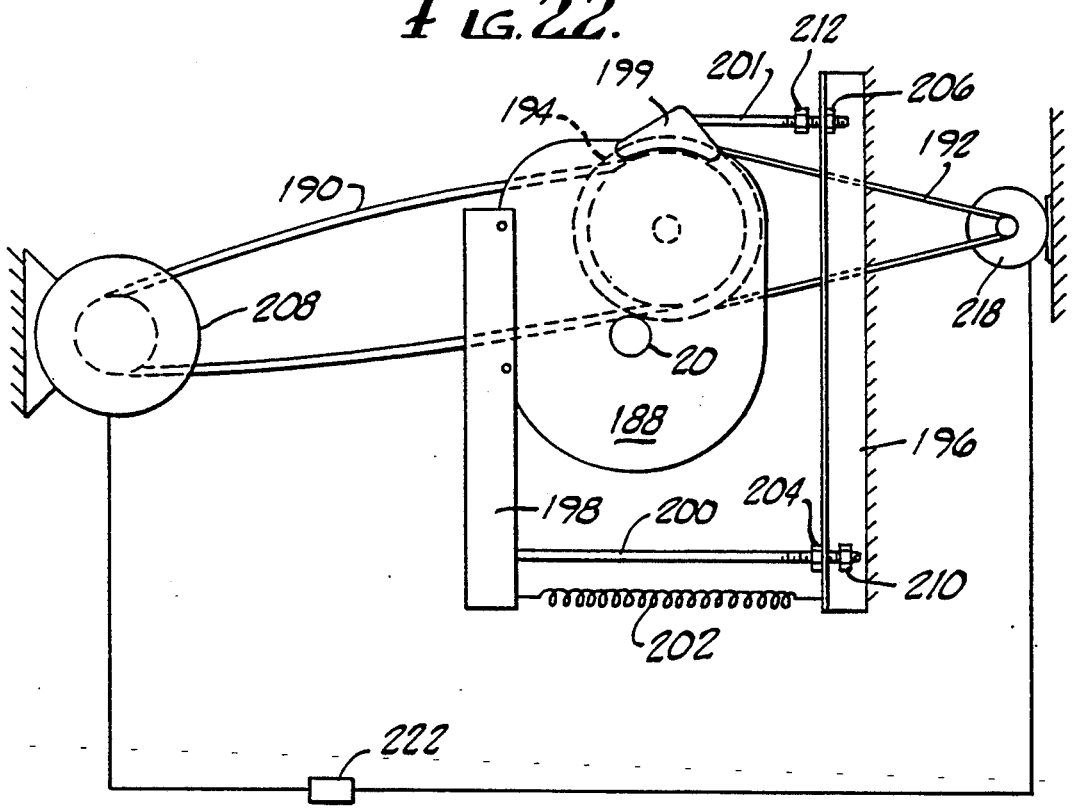
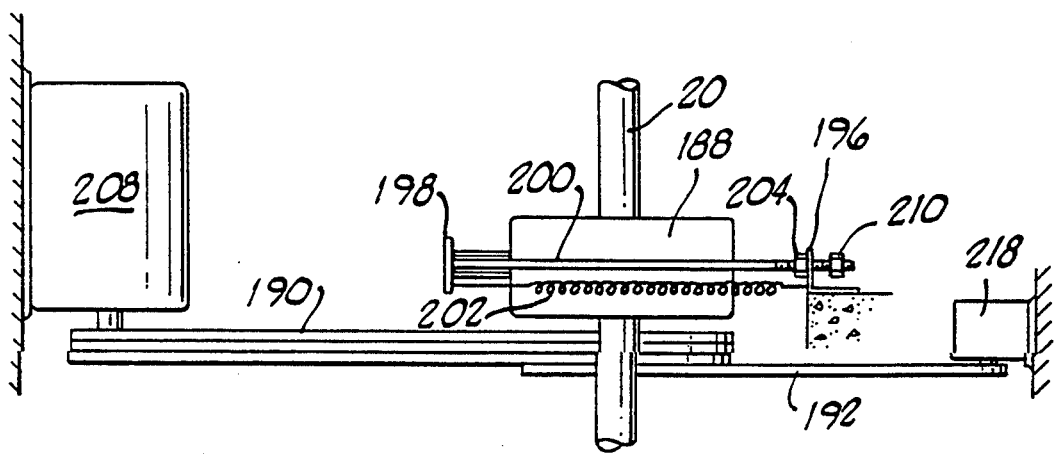

VERTICAL WINDMILL WITH OMNIDIRECTIONAL DIFFUSION

This is a continuation of U.S. patent application Ser. No. 645,968 filed Jan. 25, 1991, now U.S. Pat. No. 5,057,696.

BACKGROUND OF THE INVENTION

This invention relates to lift type, vertical axis windmills. More specifically, the present invention is directed to a lift type, vertical axis windmill having an omnidirectional diffuser including structural, safety, performance, and control features.

U.S. Pat. No. 4,115,027, the Specification of which is incorporated herein by this reference, discloses a vertical axis, lift type windmill having an omnidirectional diffuser. Vertical airfoils that provide aerodynamic lift are mounted with struts around a central shaft to form a rotor. Outwardly of the airfoils, an omnidirectional diffuser includes vertical stators, as part of the rotor support structure, having an aerodynamic elongate cross-section with the major dimension thereof extending essentially radially from the central windmill shaft. The diffuser directs the passing current of air into a zone where the airfoils, having their major dimension perpendicular to their supporting struts, produce lift and impart net torque to the rotor. The diffuser thereby makes the windmill self-start in low to moderate winds and makes it more efficient.

The diffuser stators are designed to provide more efficiency, improved by a factor of two when compared to an equivalent straight bladed vertical axis windmill not having a diffuser. The measured average maximum efficiency of the omnidiffuser vertical axis turbine is 52%. The diffuser is beneficial in low to moderate winds where self-starting properties and high efficiencies are needed.

In high winds, where there is excess power available, these performance characteristics of the diffuser are not needed. However, the stators must withstand large structural forces in high winds because of their size if their cord dimension is perpendicular to the wind vector. The structural members supporting the stators must necessarily be heavy to withstand high winds and to comply with construction codes. Thus, construction costs are significantly increased.

Windmills convert kinetic energy of the wind to a form of useful work. Power in the wind is converted to shaft power. Power in the wind is directly proportional to the turbine swept area, air density, and the cube of the wind speed.

Energy produced by a windmill is the integral of instantaneous power in the wind multiplied by the wind turbine efficiency function of windspeed, integrated over time. Energy produced by a windmill over a given time period therefore is directly proportional to its swept area and a function of the turbine's efficiency as it relates to windspeed. Consequently, turbine swept area is the normalizing factor when comparing windmills or design merits of a particular windmill.

For instance, it is beneficial to reduce the structural weight of a windmill per unit of swept rotor area, which translates into a reduced cost per unit of area. The overall guiding principle in windmill design for wind farm facilities that are designed to produce revenues from the sale of energy is to minimize turbine cost and maximize energy output. Normalizing these factors using swept rotor area allows for direct comparison of windmill design features of windmills of different types and sizes.

Aerodynamic efficiency of a windmill is such a normalized factor and is based on swept area. Swept area of the vertical axis windmill is the projected area of the cylindrically inscribed rotor onto a vertical flat plate, and is the true measure of a windmill's size. Wind resistance on the stators causes the structural weight per unit of swept area to be large, approximately 30 lbs. of steel per square foot of swept rotor area.

Stopping a windmill rotor in strong winds is a difficult task because power in the wind increases with the cube of the wind velocity. If the windmill rotor shaft is not restrained by a load (a generator for instance), the turbine freewheels. High winds have enormous power that can quickly drive a windmill rotor to very high speed and consequent destruction.

Lift continuously develops on airfoils in a runaway condition and unless the airfoils can be made to eliminate lift in a runaway condition, or unless a drag device counteracts the effect of lift, the rotor will accelerate to destruction. This is a problem with all types of windmills. A device that nullifies the aerodynamic torque of the rotor in a runaway condition, keeping the rotor from speeding beyond a safe limit, or stopping the windmill in high winds by using a mechanical brake of reasonable size, cost and reliability has previously been needed.

Windmill rotor speed must be controlled depending on the energy application. A windmill generating alternating current with a line excited generator runs at nearly constant rotational speed while generating electricity. The rotor freewheels in winds below the generation threshold. Approaching generation wind speeds, the generator must be turned on in such a way that there are no excessive mechanical or electrical surges that would cause early part failure. Electronic devices that turn the generator on gradually to avoid surges are expensive, vulnerable to harsh environmental conditions, and complex. A simple mechanical device would be preferable.

In overspeed and/or at high wind speeds, the rotor must be controlled to regulate speed or to stop the rotor. Electrical mechanical devices are currently used on most windmills, but they are not fail-safe and are not easily maintained by wind farm operators. Simple, fail-safe mechanical devices are preferred by most operators and can potentially cost less.

Each windmill operates most efficiently at an optimum rotor speed. In dimensionless terms, the rotor achieves peak efficiency at a specific so-called blade tip speed ratio. Tip speed ratio for a vertical axis straight blade windmill is the tangential speed of the blade as it moves on its circular path, divided by the freestream wind speed. Efficiency, at tip speed ratios above or below the optimum, drops off.

The most efficient windmill would operate at the optimum tip speed ratio in all winds. That is not realistic, especially with a constant speed AC generator. The rotor must turn at nearly constant speed over the range of its operating wind speeds. Consequently, only one wind speed produces the optimum tip speed ratio.

The windmill therefore operates off-design most of the time and on-design at one wind speed, the design wind speed. The design wind speed is selected generally for most windmill designs to provide the best efficiency of a turbine design as applied to a broad spectrum of wind resources. Higher efficiency could be achieved if the design wind speed could be changed to suit the wield resource. A simple mechanical drive train/generator subsystem is needed in current windmill designs to achieve a resource specific design wind speed.

Windmill transmissions are particularly vulnerable to shock loads caused by highly variable torque inputs to the transmission operating with a constant speed AC generator. Failure of transmission gears continues to be a major maintenance problem. A simple, low cost mechanical coupling is required to damp these shocks.

An omnidirectional diffuser vertical axis windmill will not function unless the airfoil thickness ratio is greater than a certain value. The windmill will not start, nor will it sustain operation, while employing airfoils with thickness ratios normally employed by most windmills. A family of airfoils specifically applicable to the omnidirectional wind turbine is needed.

SUMMARY OF THE INVENTION

It is the primary objective of this invention to provide an omnidiffuser vertical axis windmill having features ensuring safe and efficient operation and to minimize capital and operational costs.

It is a further objective of this invention to provide omnidirectional vertical axis windmills with mechanically controlled rotatable stators that maintain their cordwise dimension in the normal radial direction until the wind speed exceeds a predetermined threshold value, at which time the stators are forced out of the wind by their resistance to the wind. At very high winds, above 100 m.p.h., the cordwise dimension aligns with the wind velocity vector, exposing its minimum resistance profile. Drag (air resistance) in this configuration is one-twentieth that of the air resistance when the cordwise dimension is perpendicular to the local wind velocity vector. When wind velocity lowers, the rotatable stators return to their normal position by means of a weighted return mechanism.

It is still a further objective of this invention to provide the vertical axis windmill with rotatable airfoils that are activated in unison through a central disc which is concentric to the windmill shaft and is rotatable relative to the central shaft. The airfoils rotate (pitch) when activated through the central disc with the pitch angle being equal for all airfoils and large enough to cause airflow over the airfoil to stall, thereby eliminating aerodynamic driving torque.

It is a further objective of this invention provide the omnidirectional vertical axis windmill with a means of rotating the central disc by a rotating arm activated by centrifugal force.

It is still a further objective of this invention to provide the vertical axis windmill with a means rotating the central disc by means of a brake shoe pushing against the disc, forcing the disc to rotate relative to the central shaft. A stop limits angular rotation of the disc relative to the shaft through an angle sufficient to pitch the blades to an aerodynamic stalled condition. The omnidirectional vertical axis windmill includes a means of temporarily avoiding the stop when the rotor speed is below a predetermined low value, allowing the disc to rotate through a larger angle relative to the central shaft to a second fixed stop.

It is still a further objective of this invention to provide the omnidirectional vertical axis windmill with a means of pitching the airfoil by a mechanical connection to the rotating central disc, yet hold the airfoil tangential to the path of the airfoil orbit and not allow the airfoil to cyclically rotate even minutely when acted on by cyclic aerodynamic pitching moments.

It is a further objective of this invention provide the omnidirectional vertical axis windmill with means of releasing the airfoil so the airfoil is free to rotate more than 360 degree after the central disc rotates to its second fixed stop.

It is a further objective of this invention to provide the omnidirectional vertical axis windmill with a means of activating the brake shoe against the disc when the rotor speed exceeds a predetermined value.

It is a further objective of this invention to provide the vertical axis windmill with a means of starting and operating by employing a family of airfoils with thickness ratio (airfoil maximum thickness to elongated dimension or cord length ratio) equal to or greater than 0.18.

It is a further objective of this invention to provide the vertical axis windmill with an automatically adjusting belt drive between the generator and transmission to protect the transmission from shock loads, to improve drive train efficiency with variable belt tension, and to cause the drive train belts to slip at power levels outside the system limits.

It is a further objective of this invention to provide the vertical axis windmill with a means of adapting its generator and drive train to a spectrum of wind sites, using a bell drive linkage that has a range of pitch diameter ratios.

It is a further objective of this invention to provide the vertical axis windmill with a means of smoothly activating generator through the use of a control motor to eliminate the need for an electronic starting circuit.

It is a further objective of this invention to provide the omnidirectional vertical axis windmill with a means of generating alternating current electricity in wind speeds below the main generator operational speed and thereby increase energy productivity.

These and other objectives are realized and the limits of the prior art are overcome in this invention by rotatably attaching the stators to the main vertical structural steel tubes with bearings. The stators are mounted so the centroid of the rectangular area of the stator, projected on a vertical flat plane parallel its cordwise dimension, is offset from the stator hinge line. Wind resistance force, caused by the stator, will act at or near the centroid, causing a moment about the hinge line that would further cause the stator to rotate in the direction of wind action.

The stator is restrained from rotational movement by means of a weight attached to the stator at a point offset from the hinge line in the lateral direction the centroid by a cable threaded through two right angle turns. Tension in the cable, caused by the weight, provides a conteracting moment to the aerodynamic moment, which holds the stator in place at wind velocities below a predetermined magnitude and direction.

When the vertical plane containing the cordwise dimension of the stator is coincident with the vertical plane containing the weight vector, the stator is in the null or operational position; i.e., aligned radially the central axis of the windmill. When the wind rotates the stator in either direction, a return moment is formed and the cable is forced to turn 90° in the horizontal plane, moving a distance measured from the vertical plane defined by the weight vector and the windmill radial dimension. At small angular perturbations of the stator from the horizontal plane, cable tension acts perpendicular to the stator cordwise dimension. In very high winds, the stator will seek an angular attitude the wind of least air resistance.

The stator will rotate so that its cordwise dimension aligns with the wind vector. The weight attached to the cable can move from its static position very near ground level to a height limited by the windmill structure, providing enough cable length allow the stator one revolution of movement. If further rotation is required, the cable is released at the mechanical connection between the cable and the stator by simply pulling out of its connector, allowing the stator to freely rotate. When wind velocity reduces, the stators gradually return to their radially oriented position for normal and efficient windmill operation.

The objectives are realized and the limits of the prior art are further overcome in this invention by freely attaching the airfoils on each end to struts mounted radially and in horizontal planes to the central shaft, so that the struts structurally support the weight of the airfoils and transmit torque caused by wind flow acting on the airfoils. The airfoils are mounted in such a way that they are free to rotate about a vertical elongate axis passing through the blade and through the centerline of concentric shafts located on each end the airfoils perpendicular to and intersecting the airfoil mean cord line at some distance between the leading and trailing edge of the airfoil. The airfoils are mounted in bearings located on the ends of each top and bottom strut.

A rail is attached to the bottom of the airfoil, i.e. that end closest to the ground. The rail extends from the airfoil to the trailing edge coincident with the airfoil mean cord line. A bearing fits within this rail having a vertical axis of rotation such that it can freely rotate as a wheel along the rail.

The rail bearing is mounted on a short shaft than is attached to a flat cam-shaped plate that lies in a horizontal plane and is rotatably mounted on the strut. The hinge line of the cam plate is parallel to the hinge line of the airfoil but offset from it in a direction toward the central shaft of the windmill and behind (down wind of) the strut. Rotation of the cam plate moves the rail bearing aft of the airfoil shaft toward the airfoil trailing edge, causing the airfoil trailing edge to rotate toward the central shaft and the strut. In this manner, the airfoil is rotated or pitched to an angle as to cause air flow over the airfoil to separate and the airfoil to stall, transforming its function from positive torque producing element to a negligible or negative torque producing element.

A cable is attached to the central disc aft or down wind of the hinge line to pivot the cam away from the airfoil. Rotation of the central disc relative to the central shaft, that is, in the direction of desired blade pitch, causes tension in the cable, which rotates the plate and pitches the airfoils.

A retaining spring holds the central disc in its null operational condition until an external force causes the disc to overcome spring tension and to rotate. A stop is provided for the spring to act against under null operational condition. The cam plate is held in its null operational condition by a spring that acts against a cam stop. When tension in the cam actuation cable is small, the spring returns the cam to its stop position.

The cam in its stop position is oriented so that horizontal line intersecting both the rail bearing centerline and the cam hinge line is parallel to the radial centerline of the strut. Moments acting on the airfoil cannot act to rotate the cam plate in this configuration. The blade is held fast and not subject cyclic aerodynamic pitching movements.

All airfoils are connected to the central disc through the cable and cam mechanism. Consequently, rotation of the central disc relative to the central shaft and struts simultaneously rotates all of the airfoils equal angles relative to the struts.

When acted upon by an external force, the central disc rotates against a retaining spring through a predetermined angle to a removable stop. The airfoils are rotated (pitched) to a related predetermined angle and held in that position by the cam-rail bearing mechanism. When the windmill rotor slows below a predetermined speed, the removable stop is spring activated to clear out of the disc path. The disc rotates to a further fixed stop and through a larger angle. The cam rotates further to a larger angle, such that the rail bearing rotates past the end of the rail. The rail bearing and cam plate are then clear of the rail or any other part on the airfoil. The airfoil is then free to align its cord to the wind vector and thereby greatly reduces resistance of the airfoil to high winds for the same reasons stated regarding the stators. The airfoils are allowed to feather in this way when a mechanical braking external force is applied to the disc.

External forces act against the retaining spring rotate the central disc relative to the central shaft. The external forces are caused by brake shoes pressing against the bottom surface of the disc or a centrifugal arm activated by centrifugal force to move against the restraining spring and against the disc, causing the disc to rotate.

The brake shoes are mounted on one end of a substantially horizontal oriented lever that has a fulcrum support near the brake shoes and weights on the other end of the lever. A considerable mechanical advantage is provided by the lever Co exert a large braking force on the bottom of the disc. The disc is restrained from moving upward in the direction of the brake force by a bearing surface that restrains the disc in vertical motion but allows it to rotate.

The brake lever is held up on the weighted end that the brake shoes are rotated to a position below the disc when the rotor is allowed to rotate freely. The weighted end of the lever is lowered to engage the brake shoes with the disc by means of a hand-operated winch. The winch is either lowered manually or released through a trip mechanism, allowing the lever to drop.

Velocity of the lever while dropping is dampened by a hydraulic shock absorber. The trip mechanism is a spring-loaded trigger that is released when a spring restrained arm strikes a latch holding the trigger, releasing the trigger and concurrently releasing the winch locking latch that allows the winch to freely reel out. Therefore, the brake is engaged when the rotor exceeds a predetermined speed.

The disc brake can also be centrifugally activated by a centrifugal arm that is held in a fixed position against a stop until rotor speed increases to a predetermined value and centrifugal acceleration rotates the arm. Once the arm commences rotation, the moment arm between the center of gravity of the arm and the hinge point increases and the moment arm between the spring line of tension and the hinge line decreases, resulting in a rapidly increasing net movement, forcing the center of gravity of the arm in a direction away from the disc.

A cable is attached to the arm and to the disc. It is slack when the arm is in the unactivated position and becomes tense when the arm can produce a high actuation torque and consequent high tension in the cable. The cable rotates the central disc relative to the central shaft, which in turn pitches the airfoils to inhibit rotor speed. Rotor speed is thus governed to remain within a structurally safe range. Speed governing occurs if the brake system fails, or in the case where the shaft rotates at variable speed under load, as is the case with most applications except with line excited AC generators.

The removable stop, which limits disc rotation when the brake is applied such that the airfoils pitch to stall angle but are not released to rotate freely, is mounted to the central shaft. It is a weighted arm that pivots about a horizontal hinge line, allowing the arm pivot in a vertical plane that passes through the center of the arm and the central shaft centerline. The arm is pulled up toward the central shaft when the rotor is at rest or at low speed.

When the rotor surpasses a predetermined speed, centrifugal force rotates the arm into a horizontal position. A gate shaft is mounted on the end of the arm with an axis parallel to the arm centerline. A vertical surface on the central disc rests against the bearing mounted shaft when the disc is rotated into position by brake action. When the rotor speed falls below the predetermined threshold, the arm rotates upward with the shaft rotating against the stop to reduce friction. The spring pulls the arm and gate shaft clear of the vertical surface of the disc. The disc continues to rotate to a fixed stop. The airfoils are therefore released to fully feather when the rotor is stopped.

The limits of the prior art are further overcome in this invention by employing airfoils with thickness ratios greater than 0.18. Airfoils used on most windmills have thickness ratios of 0.15 or less.

According to another aspect of the present invention, the slow, high torque motion of the central shaft rotation is transformed to high speed low torque shaft speed by a shaft-mounted gear transmission and a V-belt transmission link. Generator shaft speeds are many times that of the central shaft speed. The V-belt transmission link reduces shock loads on the gear transmission. The pitch diameter ratios of the V-belt transmission link can be easily changed to allow for a range of rotor speeds given a constant speed induction generator.

The transmission drive train is adapted to provide low belt tension at low or no torque input to high belt tension at high torque. The gear transmission is mounted on the main shaft and would rotate freely if it were not restrained by an external frame and spring. The transmission is held against a stop by spring retention and adjusted to maintain a predetermined V-belt tension such that under high shock generator starting torques, the belts can slip providing a shock buffer between the generator and transmission.

Under high torque input, the transmission rotates away from the low torque stop to a high torque stop, adjusting V-belt tension to allow the belt to slip if a predetermined torque is exceed. Belt slippage causes the rotor to speed up, which activates the brake. This is a means of stopping the turbine in high winds.

An induction motor/generator is mounted on the side of the transmission opposite the main generator. A small V-belt with a very high pitch diameter ratio links this generator to the transmission so the rotor speed is about one-fourth of its operational speed when this generator is engaged and the main generator is turned off. This motor/generator remains engaged unless the main generator is on. Consequently, the motor/generator operates when wind speeds are below the main generator threshold.

When the motor/generator is turned on and it driving the rotor, which occurs at very low wind speeds, V-belt tension between the motor/generator and the transmission is highest. A retention spring holds the transmission against the low torque stop.

As wind speed rises, the motor becomes a generator and torque flowing through the transmission causes it react against the retention spring. At a predetermined value, this torque overcomes the retention spring force and the transmission moves away frown the low torque stop, loosening the motor/generator V-belt until, at some point, it begins to slip, causing the rotor to accelerate. The rotor continually and gradually accelerates to the large generator speed. At that time, the large generator is turned on by an electronic tachometer switch that concurrently turns the motor/generator off.

The large generator operates until the rotor torque goes to zero, or is negative. The switch shuts it off and the motor/generator on. The motor/generator decelerates the rotor to the motor/generator speed, which is about ¼ of the large generator rotor speed.

BRIEF DESCRIPTION OF THE DRAWINGS

Other features and advantages of the invention will be apparent from the following Detailed Description taken in conjunction with the accompanying drawings, in which:

FIG. 1 is a perspective view of a three-level vertical windmill incorporating various aspects of the present invention, certain parts being removed for simplicity of illustration;

FIG. 2 is a perspective view of a single-level vertical windmill incorporating various aspects of the present invention, certain parts being removed for simplicity of illustration;

FIG. 3 is a schematic top view of the vertical windmill of FIG. 2 showing only the major elements of the structure and, in dashed lines, rotation of the stators;

FIG. 4 is an enlarged cross-sectional view of one of the stators of the windmill of the present invention taken along the line 4—4 of FIG. 2;

FIG. 5 is a side view of the bottom of one of the stators of the windmill of the present invention showing a system for controlling rotation of the stator;

FIG. 6 is a fragmentary cross-section taken along the line 6—6 of FIG. 5;

FIG. 7 is a schematic cross-section of one of the airfoils of the present invention;

FIG. 8 is a diagramatic top view of a portion of the windmill rotor of the present invention showing the rotation of the airfoils in dashed lines and part of the braking mechanisms for the airfoil;

FIG. 9 is a schematic top view taken about line 9—9 of FIG. 8;

FIG. 10 is a schematic top view taken about line 9—9 of FIG. 8 showing actuation of the airfoil rotation braking mechanism of the present invention;

FIG. 11 is a schematic top view taken about line 9—9 of FIG. 8 showing the airfoil disengagement braking mechanism of the present invention;

FIG. 12 is a cross-sectional view taken along line 12—12 of FIG. 9;

FIG. 13 is a partial side elevational view of the central shaft of the present invention showing the disc brake and right angle bracket used for braking;

FIG. 14 is a second partial side elevational view of the central shaft showing actuation of the disc brake;

FIG. 15 is a partial top view taken along the line 15—15 of FIG. 13 showing the central disc position when the airfoil cam is in the position shown in FIG. 13;

FIG. 16 is a partial top view taken along the line 15—15 of FIG. 13 showing the central disc position when the airfoil cam is in the position shown in FIG. 11;

FIG. 17 is a partial top view taken along the line 15—15 of FIG. 13 showing the central disc position when the airfoil cam is in the position shown in FIG. 11;

FIG. 22 is a top schematic view showing a motor/generator drive mechanism according to the present invention; and FIG. 23 is a partial side schematic view of a motor/generator drive mechanism according to the present invention.

DETAILED DESCRIPTION

Figure 18:
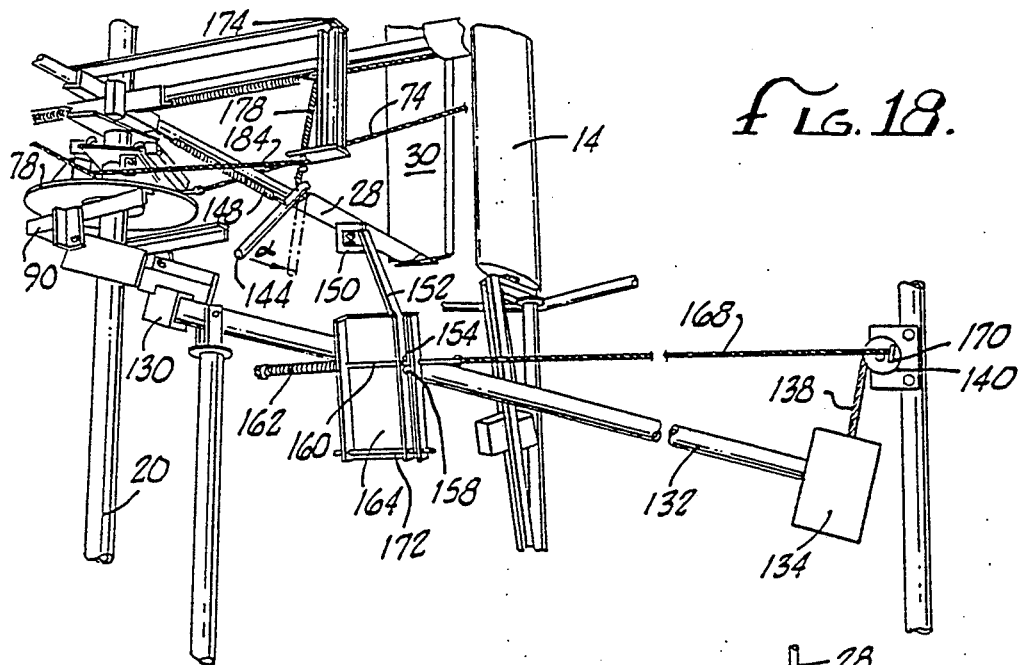
FIG. 18 is a partial perspective view showing high speed safety centrifugal braking mechanism according to the present invention.

As shown in the drawings, the present invention is embodied in a vertical windmill 10 that includes an omni-directional diffuser 12 defined by a plurality of vertical stators 14. The stators are equally spaced circumferentially about a vertical central axis 18 at a uniform radial distance from the axis. A central shaft 20 is rotatably mounted in a gearbox 22 and bearings 24 along the central axis of the windmill. Radial struts 28 attach a airfoils 30 to the central shaft inward of the omnidirectional diffuser at a fixed radial distance from the central shaft. A support frame 32 that includes upper and lower support bars 34 supports the central shaft and the stators.

The cross-section of each airfoil 30 is designed to provide aerodynamic lift. The airfoils are preferably equally spaced circumferentially about the central shaft 20. As is evident from comparing FIGS. 1 and 2, the windmill 10 of the present invention may contain one or more levels of stators 14 and airfoils.

According to one aspect of the present invention, the stators 14 may rotate from radial alignment to variable alignment, either to increase efficiency or to withstand high winds, as depicted by the dashed lines in FIG. 3. Although several mechanisms could be used, the mechanism presently contemplated for turning the stators is best depicted in FIGS. 4, 5 and 6. Each stator is attached to steel tubes 38 and column fairing bearings 40 allow them to rotate. Each stator is mounted so the centroid 44 of the stator is offset from the steel tube centerline.

Wind resistance will act against the stators 14 at or near the centroid 44, causing the stator to rotate about the steel tube 38 in the direction of the wind. A weight 48 is attached to the stator at the point offset from the steel tube by a cable 50 passing through pulleys 52. Tension in the cable, caused by the weight, restrains rotation of the stator at wind velocities a predetermined magnitude and direction.

When the vertical plane containing the cordwise dimension of the stator 14 is coincident with the vertical plane containing the weight 48, the stator is the null or operational position, i.e. aligned radially to the central axis 18 of the windmill 10. When the stator is perturbed by the wind to rotate (as shown in FIG. 6) in either direction, a return moment is formed when the cable 50 is forced to turn 90° around pulley 52 in the horizontal plane measured from the vertical plane defined by the weight vector and the windmill radial dimension. At small angular perturbations of the stator from this plane, the tension in the cable acts perpendicular to the stator cordwise dimension. In very high winds, the stator seeks the angular attitude of least air resistance. The stator will rotate so that its cordline aligns with the wind vector, raising the weight.

The weight 48 attached to the cable 50 can move from its static position very near ground level (as shown in FIG. 5), to a height limited by the windmill structure, providing enough cable length to allow the stator 14 one revolution. If further rotation is required, the cable is released by disconnecting the mechanical connection 54 between the cable and the stator, allowing the stator to freely rotate. When wind velocity reduces, the stators gradually return to their radially oriented position for normal and efficient windmill operation. Thus, the vertical windmill presents a reduced cross-section to high winds and the structural support necessary for the windmill is significantly reduced, which can provide as much as a 50% reduction in the amount of steel necessary to support to the windmill.

As shown in FIG. 7, each of the airfoils 30 has a thickness t and a cord length c. According to a preferred embodiment of the invention, the thickness ratio t/c is 0.18 or greater to provide self-starting and sustained operation for the windmill. Although the prior art teaches that 0.15 is frequently too large a ratio, it has been experimentally determined that a thickness 0.18 or greater is preferable in the vertical windmill environment described to provide self-starting in low wind, and sustained operation in higher winds.

According to another aspect of the present invention, each of the airfoils 30 may turn about a vertical elongated airfoil shaft 58 to reduce the lift the airfoils and slow rotation of the windmill 10. As depicted in FIGS. 8–12, a cam-cable braking mechanism 60 is one method for reducing or eliminating the lift on the airfoils and thereby slowing the rotation of the central shaft 20 of the windmill 10. Each airfoil is attached to the end of top and bottom radial struts 28 mounted to the central shaft. The airfoils are mounted in such a way that they are free to rotate about the airfoil shaft, which passes through the blade end of the airfoil, perpendicular and intersecting to the airfoil mean cord line at some distance between the leading and trailing edge of the airfoil (See FIG. 8).

The airfoil shafts 58 are mounted in bearings located on the ends of each top and bottom strut 28. A rail 62 (shown in FIG. 9) is attached to the bottom of the airfoil 30, i.e. that end closest to the ground. The rail extends from near the airfoil shaft 58 aft to the trailing edge coincident with the airfoil mean cord line. A rail bearing 64 fits within this rail having a vertical axis of rotation such that it can freely rotate as a wheel along the rail. The rail bearing is mounted on a short shaft 68 that is attached to a flat cam plate 70, which lies in a horizontal plane and is mounted on the strut 28 so that it can be rotated (as shown in FIG. 10).

The rotational axis 72 of the cam plate 70 is parallel to the axis of the airfoil 30, but offset from it (as shown in FIGS. 9, 10, and 11) in a direction toward the central shaft 20 and behind (down wind of) the strut 28. Rotation of the cam plate moves the rail bearing 64 aft of the airfoil shaft 58 (as shown in FIG. 10) toward the airfoil trailing edge, causing the airfoil trailing edge to rotate toward the strut and central shaft 20. In this manner, the airfoil is rotated or pitched to an angle so as to cause air flow over the airfoil to separate and the airfoil to stall, transforming the airfoil from a positive torque producing element to a negligible or negative torque producing element.

The cam plate 70 is rotated by a first cable 74 (shown in FIG. 9) attached to a central disc 78 that is mounted around the central shaft 20. The first cable is attached in a direction aft or down wind of the cam axis 72 to cause the cam to rotate away from the airfoil shaft 28. Rotation of the central disc 78 relative to the central shaft 20 as the blade pitches causes tension in the first cable that rotates the cam plate. The cam plate 70 is held in the null operational condition by a spring 80, attached to a second cable 84 (shown in FIG. 9), which acts against the cam plate. When tension in the first cable is small, the spring action of the second cable returns the cam plate to its stop position.

The central disc 78 is held in the null operational condition by retaining springs 86. When the central disc is acted on by an external force, the spring tension is overcome and the central disc rotates. As shown in FIG. 8, the retaining springs are attached at one end the central disc and at the other end to the struts 28. Two central disc spring retention stops 88 for the springs to act against in the null operational condition are also shown in FIG. 8.

The cam plate 70 in its stop position is oriented so that a line (as shown in FIG. 9) intersecting both the rail bearing 64 centerline and the cam axis 72 is parallel to the radial centerline of the strut 28. Moments acting on the airfoil 30 cannot act to rotate the cam plate in this configuration. The airfoil is held fast and not subject to cyclic aerodynamic pitching moments.

A cam-cable braking mechanism 60 connects each of the airfoils 30 to the central disc 78. Consequently, rotation of the central disc relative to the central shaft 20 causes all the airfoils to rotate at equal angles relative to the struts. Because each of the airfoils has an associated cam-cable braking mechanism as described, the rotational speed of the windmill can be controlled with only a slight exertion of pressure by a disc brake 90 (see FIG. 13) against the central disc, thereby improving the longevity of the disc brake and greatly increasing the safety of the windmill.

As depicted in FIGS. 13 and 14, another aspect of the present invention is a stop/release mechanism for the disc brake 90. Specifically, a right angle bracket 94 is pivotally mounted to a sleeve 98 around the central shaft 20. A cable 100 is attached between the right angle of the bracket and a spring 102. The spring is attached to a plate 104 that is mounted on the central shaft above the sleeve.

As shown in FIG. 13, in normal operation, centrifugal force pivots the right angle bracket 94 from the central shaft 20 and extends the spring 102. A gate shaft 108 mounted by two pillow blocks 110 and 112 to the bottom of the right angle bracket is held away from a first stop 114 on the central disc 78 in the approximate angle theta indicated in FIG. 15. When the brake shoe 118 is applied against the central disc 78, the central disc rotates relative to the central shaft 20 through the angle theta so that the gate shaft pushes against the first stop. This causes the central disc to rotate at the same speed as the central shaft, and results in the relative position of the gate shaft, first stop and central disc shown in FIG. 16. The slowing of the central disc, as shown in FIG. 10, actuates the cam-cable braking mechanism 60 to rotate the airfoils 30 and cause the airfoils to lose lift.

As depicted in FIGS. 9 and 10, the rail bearing 64 on the cam plate 70 is used to position the airfoil 30 with respect to the strut 28 and thus the windmill 10. To stop the rotation of the windmill, the disc brake 90 is applied sufficiently to slow the rotation of the central shaft 20. At a certain rotational speed, the centrifugal force acting against the right angle bracket 94 no longer overcomes the force exerted on the bracket by the spring 102. The right angle bracket thus pivots toward the central shaft to the position shown in FIG. 14. Pivoting of the right angle bracket lifts the gate shaft 108 so that the gate shaft passes over the first stop 114. The central disc 78 rotates through an angle phi to the relative position shown in FIG. 17. This additional rotation causes the first cables 74 to pull the cam plates 70 completely off the rails 62, as shown in FIG. 11, so that the airfoils 30 react freely to the wind and lose all lift. Continued pressure on the disc brake will then stop the rotation of the windmill.

As the rotation of the central shaft 20 slows, the central disc 78 rotates until a second stop 120 mounted on the central disc contacts an angle bracket 122 that is mounted to the bottom of the sleeve 98. Thereafter, the central disc rotates at the same speed as the central shaft. As a result, the first and second cables 74 and 84 are not damaged by continuing relative angular rotation between the central disc and the central shaft.

As depicted in FIG. 8, the retaining springs 86 are attached to the central disc 78 to counteract the effect of the disc brake 90 on the central disc. In other words, the retaining springs 86 exert a force that tends to pull the central disc to the normal operating position. If the disc brake 90 is actuated (causing the central disc to slow rotation relative to the central shaft 20 and the first cables 74 to turn the airfoils 30) and then released, the retaining springs pull the central disc back into the normal operational position. This results in the cam plates 70 rotating the airfoils from the position shown in FIG. 10 having reduced lift or no lift to the position shown in FIG. 9 having maximum lift. Thus, the retaining springs countermand the effect of the disc brake and hold the airfoils in the proper position for normal operation that is shown in FIG. 9.

As is diagrammatically shown in FIG. 18, the brake shoe 118 and disc brake 90 are connected by a series of joints 130 to a lever arm 132 having a weighted block 134 on its outward end, away from the central shaft 20. The block is connected by a line 138 to a winch 140. By activating the winch to lower the block, the brake shoe 118 acts against the bottom of the central disc 78 and the rotational speed of the rotor formed by the central shaft, the struts 28, and the airfoils 30 is slowed as described above with reference to FIGS. 8-17.

Another aspect of the present invention is a high speed fail-safe centrifugally actuated braking mechanism designed to protect the windmill 10 from the damage that may be caused by extremely high winds. According to this aspect of the invention, a weighted lever 144 is pivotally mounted to one of the struts 28 or to the central shaft 20, and a spring 148 connects an inner portion of the strut to the lever. As the airfoils 30 rotate, centrifugal force gradually pivots the end of the weighted lever 144 that is connected to the spring 148 through an angle alpha toward the circumference of the windmill.

A target 150 is mounted on the end of a piece of angle iron 152. A notch 154 in the angle iron holds a stop 158 that is fixed to a bar 160. In normal operation, the stop fixed in the notch counteracts the biasing of a compression spring 162 that pushes against a fixed housing 164 and pulls the bar and a connecting tether 168. The end of the tether attaches to a winch release 170 on the winch 140.

If a critically high rotational speed is reached, the lever 144 rotates through the angle alpha to strike the target 150, the angle iron 152 pivots about a rod 172 and releases the stop 158. The compression spring 162 pulls the bar 160 and the tether 168, releasing the winch release 170. As a result, the winch 140 immediately lowers the weighted block 134, causing the brake shoe 118 to push against the central disc 78 and completely stop the windmill 10, as described above. Thus, the centrifugally activated brake mechanism provides a safety brake to stop dangerous high speed rotation of the windmill in extremely high winds.

Figure 19:
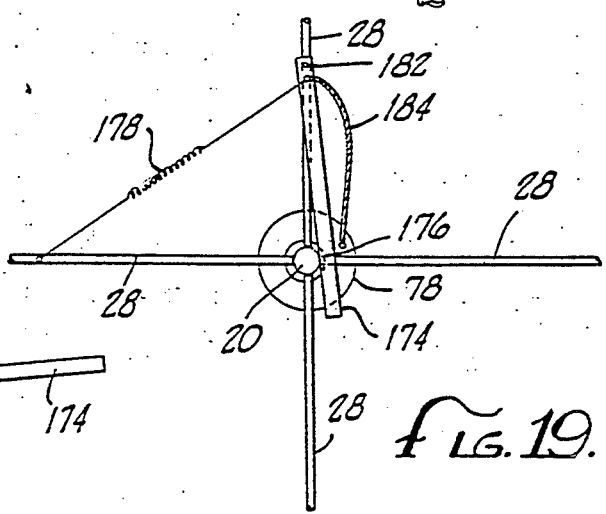
FIG. 19 is a top schematic view showing the centrifugal arm in the retained position.

The central disc 78 is rotated relative to the central shaft 20 through the action of external forces acting against the retaining springs 86. The external forces are either caused by the brake shoe 118 pressing against the bottom surface of the central disc, or a centrifugal arm 174 activated by centrifugal force to move against the retaining springs 86 and against the central disc, causing the central disc to rotate. As shown in FIG. 19, the centrifugal arm 174 is held in a fixed position against a stop 176, until rotor speed increases to a predetermined value, by a spring 178 that is attached to one of the struts 28.

Figure 20:
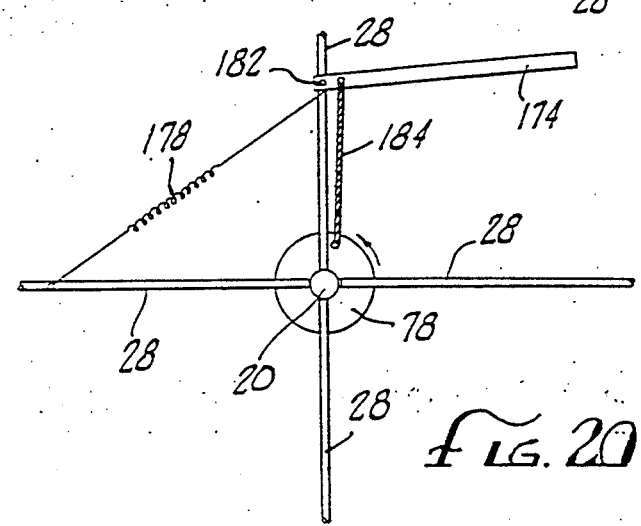
FIG. 20 is a top schematic view showing the centrifugal arm fully extended.
Figure 21:
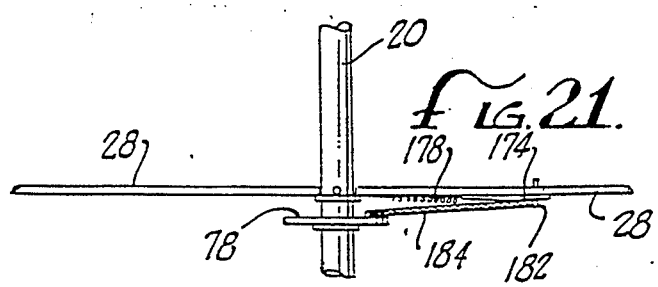
FIG. 21 is a partial side schematic view of the centrifugal arm fully extended.

Centrifugal acceleration pivots the centrifugal arm 174 about a hinge point 182. Once the centrifugal arm commences pivoting, the moment arm between the center of gravity of the centrifugal arm and the hinge point increases and the moment arm between the spring line of tension and the hinge line decreases, resulting in a rapidly increasing net moment forcing the center gravity of the arm in a direction away from the central disc 78, as shown in FIG. 20.

A cable 184 is attached to the centrifugal arm 174 and the central disc 78. The cable is slack when the centrifugal arm is in the unactivated position and becomes tense when the centrifugal arm can produce a high actuation torque and consequent high tension in the cable. The cable rotates the central disc relative to the central shaft 20, which in turn activates the camcable braking mechanism 60 to rotate the airfoils 30 and slow rotor speed. Rotor speed is thus governed to remain within a structurally safe range. Speed governing occurs if the brake system fails, or in the case where the central shaft rotates at variable speed under loads, as is the case with most applications except with line excited AC generators.

According to another aspect of the present invention, the slow, high torque motion of the central shaft 20 is transformed to a high speed, low torque motion by a shaft-mounted gear transmission 188 and two V-belts 190 and 192 that form a transmission link with the transmission sheave 194 (shown in FIGS. 22 and 23). Generator shaft speeds are many times higher than the central shaft speed of the transmission sheave 194. The V-belts provide a transmission link that reduces shock loads on the transmission. The pitch diameter ratios of the V-belt transmission link can be easily changed to allow for a range of rotor speeds given a constant speed induction generator.

The transmission 188 and V-belts 190 and 192 are adapted to provide low belt tension at low or no torque and high belt tension at high torque. The transmission is mounted on the central shaft 20 and would rotate freely if it were not restrained by an external frame 196 through transmission frames 198 and 199, bolts 200 and 201 and retention spring 202. The transmission is held against low torque stops 204 and 206, as shown in FIG. 22, by spring retention and adjusted to maintain a predetermined tension in the V-belts 190 and 192 such that under high shock generator starting torques, the V-belts can slip and provide a shock buffer between the transmission and a main generator 208. Under high torque input, the transmission pivots the transmission frames 198 and 199 and bolts 200 and 201 away from the low torque stops to contact high torque stops 210 and 212 shown in FIG. 22, adjusting V-belt tension to allow the belt 190 to slip if a predetermined torque is exceeded. Belt slippage causes the rotation of the central shaft 20 to speed up, which activates the cam-cable braking mechanism 60 and slows the rotation of the central shaft 20, thereby stopping the windmill 10 in high winds.

An induction motor/generator 218 is mounted on the opposite side of the transmission 188 from the main generator 208, as shown in FIGS. 22 and 23. The small V-belt 192, which has a very high pitch diameter ratio, links the motor/generator to the transmission so the rotor speed is about one-fourth of its operational speed when the motor/generator is functioning and the main generator is turned off. The motor/generator is turned on, unless the main generator has been turned on. Consequently, the motor/generator operates when wind speeds are below the main generator threshold.

When the motor/generator 218 is turned on and driving the sheave 194 and thus the central shaft 20 (which occurs at wind speeds below 5 m.p.h.), tension in the V-belt 192 between the motor/generator and the transmission is highest. The transmission rests against the low torque stops 204 and 206, under the influence of the retention spring 202. When wind speed rises, the motor/generator becomes a generator and torque flowing through the transmission causes the transmission to push against the retention spring 202. When this torque reaches a predetermined value, the retention spring force is overcome and the transmission pivots the bolts 200 and 201 away from the low torque stops 204 and 206 and toward the high torque stops 210 and 212, loosening the V-belt 192 until, at some point, that belt begins to slip, causing the sheave 194 to accelerate.

The sheave 194 gradually accelerates to the main generator 208 speed. At that time, an electronic tachometer switch 222 turns the main generator 208 on and concurrently turns the motor/generator 218 off. The main generator operates until the rotor torque goes to zero, or is negative. The electronic tachometer switch then shuts the main generator off and the motor/generator on. The motor/generator decelerates the central shaft 20 to the motor/generator speed, which is about one-fourth of the main generator speed.

This motor/generator arrangement simplifies the electric controls on the windmill 10, allows for energy production in low winds, prevents stalls, improves cold climate operation because the motor/generator 218 keeps the bearings 24 and gearbox 22 moving, and results in greater net energy output. The motor/generator also provides good public relations, because viewers generally do not understand that if the wind is too low, the central shaft 20 cannot turn, and so the motor/generator drives the airfoils 30 for demonstrative purposes. Furthermore, because of the "soft" coupling between the main generator and the gearbox, gearbox life is increased significantly and high wind braking may be made smoother.

From the foregoing, it will be appreciated that the present windmill includes numerous safety and structural features. The windmill meets construction codes with significantly less structural strength, utilizes a drop in aerodynamic lift to slow or stop rotation of the airfoils, and includes a safety centrifugal braking mechanism and a motor/generator to drive the windmill and produce power in low winds. While several particular forms of the invention have been illustrated and described, various modifications can be made without departing from the spirit and scope of the invention.

What is claimed is:

1. A windmill comprising:
   a support frame;
   a central shaft rotatably mounted on the support frame;
   an airfoil rotatably mounted at a fixed radial distance from the central shaft;
   a stator mounted at a fixed radial distance from the central shaft;
   means for allowing the stator to rotate about an axis and for biasing rotational movement of the stator;
   brake means for slowing the rotational speed of the central shaft; and
   means for transferring power from the central shaft.

2. The windmill of claim 1 wherein the airfoil has a substantially rigid cross-section designed to provide aerodynamic lift and the airfoil has a thickness to cord length ratio of at least 0.18.

3. The windmill of claim 1 wherein the means for transferring power from the central shaft comprises:
   a transmission drivingly connected to the central shaft;
   a main generator drivingly linked to the transmission;
   a motor/generator drivingly linked to the transmission; and
   means for pivoting the transmission from a first predetermined position when the central shaft rotates at a predetermined speed to a second predetermined position under the influence of torque of a predetermined value.

4. The windmill of claim 3 wherein the means for transferring power further comprises a switch that activates the motor/generator and deactivates the main generator at a predetermined main generator speed.

5. The windmill of claim 1 wherein the stator is rotatably mounted to a vertical shaft at a position offset from the centroid of the stator so that the stator will rotate from a predetermined alignment to variable alignment in high winds.

6. The windmill of claim 1 wherein the stator is rotatably mounted to a vertical shaft at a position offset from the centroid of the stator and comprises a vertically elongate member having an elongate cross-section with a major dimension of said elongate cross-section extending substantially radially from the central shaft when the stator is disposed in a predetermined operating position to form an omnidirectional diffuser.

7. The windmill of claim 6 wherein the means for biasing rotational movement of the stator comprises a weight and cable assembly movably attached to the stator.

8. A windmill comprising:
   a support frame;
   a central shaft rotatably mounted on the support frame;
   an airfoil rotatably mounted at a fixed radial distance from the central shaft;
   a stator mounted at a fixed radial distance from the central shaft;
   brake means responsive to a predetermined rotational speed of the central shaft; and
   means for transferring power from the central shaft.

9. The windmill of claim 8 wherein the brake means comprises a central disc mounted around the central shaft and means for rotating the central disc relative to the central shaft to cause the rotation of the central shaft to be slowed.

10. The windmill of claim 9 wherein the brake means comprises:
    a cam pivotably and releasably coupled to the airfoil;
    a first cable connected between the cam and the central disc; and
    a second cable connected to the cam in a relative position opposite that of the first cable, and to a spring to hold the cam and the airfoil in a position to provide maximum lift when tension in the first cable is relatively small.

11. The windmill of claim 9 further comprising a means for holding the central disc in a null operational condition except when the central disc is acted on by a predetermined force.

12. The windmill of claim 9 further comprising a stop member to stop rotation of the central disc relative to the central shaft and to cause the central disc to rotate along with the central shaft so that the brake means slows rotation of the central shaft.

13. The windmill of claim 9 wherein the brake means comprises a disc brake mounted in a position to exert pressure against the central disc when the brake means is activated.

14. The windmill of claim 13 further comprising a means for applying the disc brake comprising:
    means for connecting the disc brake to one end of a lever arm;
    means for connecting the other end of the lever arm to a winch; and
    means for activating the winch to move the other end of the lever arm and cause the disc brake to exert pressure against the central disc.

15. The windmill of claim 14 wherein the means for activating the winch comprises:
    a weighted lever pivotally mounted to a radial strut connecting the central shaft to the airfoil;
    a spring connecting an inner portion of the strut to the weighted lever; and
    a target that activates the winch when contacted by the weighted lever;
    whereby centrifugal force causes the weighted lever to act against the spring so that when the rotational speed of the central shaft reaches said predetermined value, the weighted lever contacts the target.

16. The windmill of claim 8 wherein the airfoil has a substantially rigid cross-section designed to provide aerodynamic lift and the airfoil has a thickness to cord length ratio of at least 0.18.

17. The windmill of claim 8 wherein the brake means includes a centrifugal brake that comprises:
   a weighted lever pivotally mounted to a radial strut;
   a target; and
   a means for activating the brake means when centrifugal force causes the weighted lever to pivot through a predetermined angle and strike the target.

18. The windmill of claim 8 wherein the brake means includes means for activating the brake means that comprises:
   a centrifugal arm pivotably attached to a radial strut supporting the airfoil; and
   a cable attached between the centrifugal arm and the central disc to cause relative rotation of the central disc when the centrifugal arm pivots about a hinge point.

19. The windmill of claim 8 wherein the brake means comprises means for rotating the airfoil about an elongated axis to cause the airfoil to lose lift.

20. The windmill of claim 19 further comprising means for releasing the airfoil to permit the airfoil to rotate freely about the elongate axis.

21. The windmill of claim 20 wherein the means for releasing the airfoil comprises:
   a plate mounted on the central shaft above a sleeve;
   a bracket pivotally connected to the central shaft;
   a gate shaft mounted to the bracket;
   a stop mounted to the central disc at a predetermined angle; and
   means for causing the bracket to pivot and lift the gate shaft over the stop.

22. The windmill of claim 19 wherein the means for rotating the airfoil is actuated by centrifugal force when the rotational speed of the central shaft exceeds a predetermined value.

23. The windmill of claim 19 wherein the means for rotating the one or more airfoils comprises:
   a central disc mounted around the central shaft;
   a connection between the central disc and the airfoil; and
   brake means for slowing rotation of the central disc and causing the central disc to rotate relative to said central shaft;
   whereby when the central disc is rotated relative to the central shaft, the airfoil is rotated about the elongated axis and loses lift.

24. A windmill comprising:
   a support frame;
   a central shaft rotatably mounted on the support frame;
   an airfoil mounted at a fixed radial distance from the central shaft;
   a stator mounted radially outward from the airfoil;
   means for slowing rotation of the central shaft; and
   belt means for transferring power from the central shaft whereby rapid changes in power will be damped by the belt means.

25. The windmill of claim 24 wherein the airfoil has a substantially rigid cross-section designed to provide aerodynamic lift and the airfoil has a thickness to cord length ratio of at least 0.18.

26. The windmill of claim 24 further comprising a transmission means on the central shaft and a generator means wherein the belt means transfers power from the transmission means to the generator means.

27. The windmill of claim 26 wherein the transmission means comprises gear means for rotating the belt means at a different speed than the central shaft.

28. The windmill of claim 26 wherein the generator means comprises a main generator connected to a first belt and a motor/generator connected to a second belt.

29. The windmill of claim 28 further comprising means for pivoting the transmission from a first predetermined position to a second predetermined position under the influence of torque.

30. The windmill of claim 28 further comprising a switch that activates the motor/generator and deactivates the main generator at a predetermined main generator speed and that deactivates the motor/generator and activates the main generator at a predetermined main generator speed.

* * * * *